INVENTOR.
WILLIAM H. RAMSELL

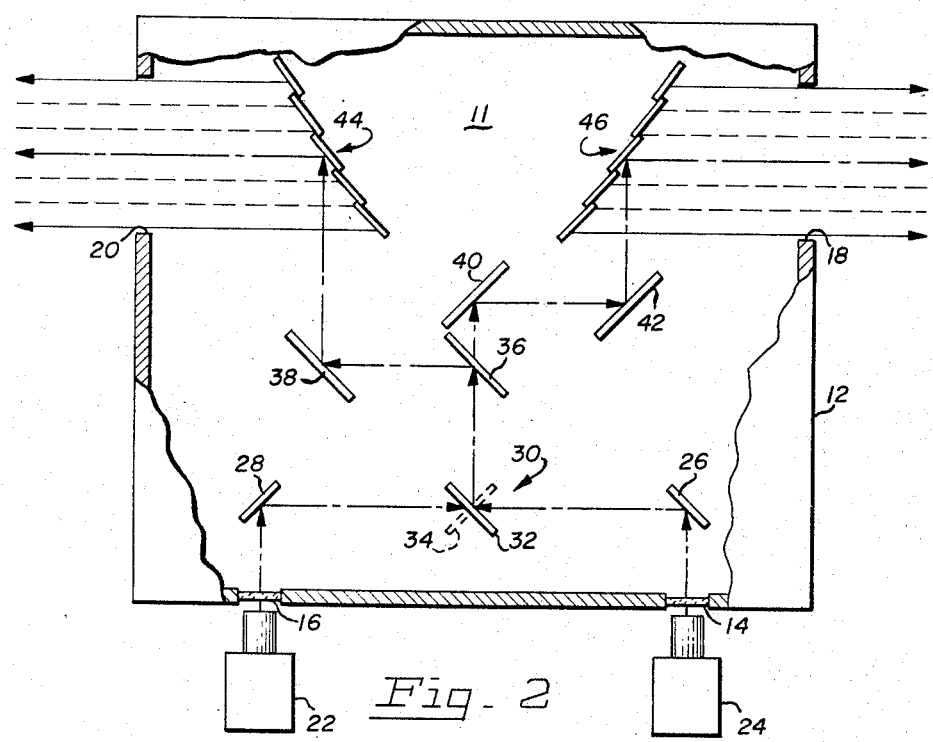
Fig. 2
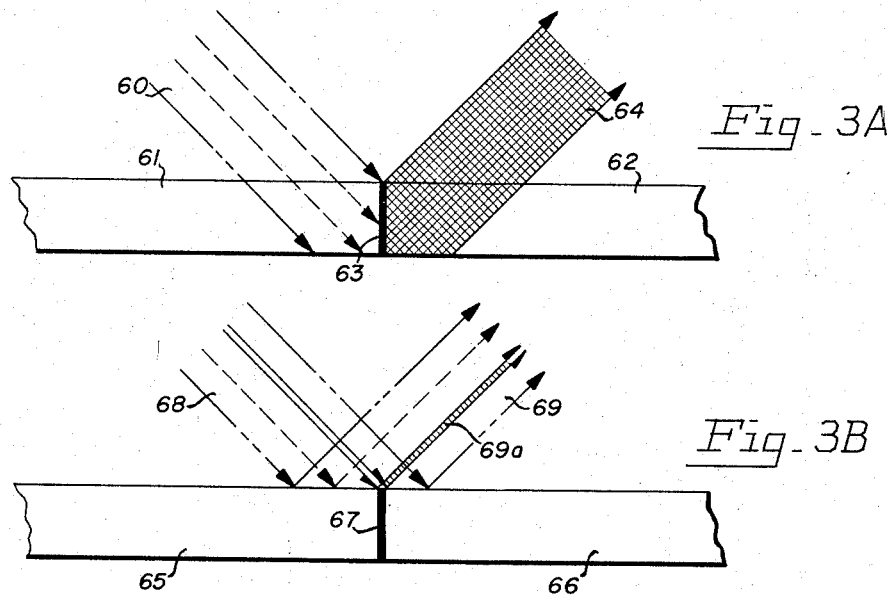
Fig. 3A
Fig. 3B

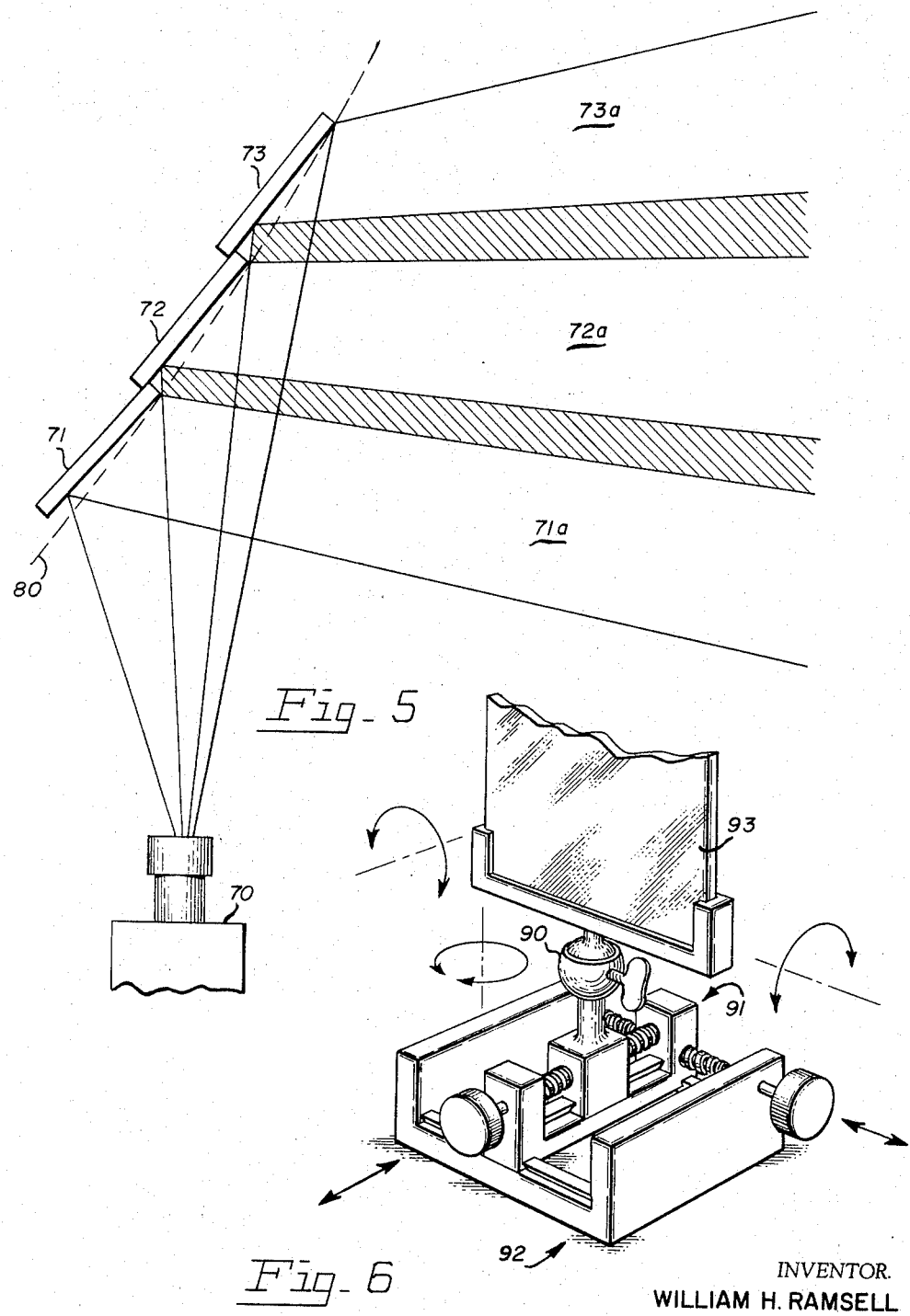

United States Patent Office 3,375,753
Patented Apr. 2, 1968

3,375,753
SEGMENTED BEAM PROJECTION SYSTEM AND METHOD FOR BENDING BEAMS
William H. Ramsell, 1682 Hamilton Ave., Palo Alto, Calif. 94303
Filed Apr. 5, 1965, Ser. No. 445,542
4 Claims. (Cl. 88—24)

ABSTRACT OF THE DISCLOSURE

A beam projection system for forming an image upon a projection screen, not in the line of sight of the projection beam, by intercepting the diverging projection beam with a plurality of reflecting surfaces to form individual diverging beam segments and by intercepting the individual beam segments with a further plurality of reflecting surfaces for directing the individual beam segments on the projection screen with adjacent edges of the beam segments in overlapping alignment.

---

This invention relates to a segmented beam projection system and method therefor, and more particularly to a projection system and method for bending a still or motion picture projection beam, one or more times, for projecting onto a screen for viewing by an audience.

It is often desirable and sometimes even necessary to enlarge and bend a beam of light, such as a projection beam, and focus the enlarged beam at a selected location. Very large reflectors, such as mirrors, are commonly used to bend the projection beam for focussing on a large screen for viewing by an audience such as in a theatre. Each of these large mirrors generally has either a front surface coated with a reflective metal such as aluminum or silver to form a front surface reflecting mirror, or the back surface of the mirror is provided with the reflective coating to form a back surface reflecting mirror.

The disadvantage of using large mirrors is in the very high cost of manufacture since most mirror manufacturers have only limited size vacuum chambers available for use in depositing either the silver or aluminum reflective coating. Therefore, the extra expense involved in producing very large mirrors stems from the necessary cost in designing and building new equipment to meet the large mirror specifications as well as the handling of such large mirrors. Mirrors in sizes necessary for bending a projection beam upon a standard wide screen for motion picture exhibition are presently unavailable at any price.

Accordingly, it is desirable to devise a beam projection system which would permit the bended or folded projection of a beam onto a large screen without the use of large single-piece mirrors. This is especially important in situations where the path of the projection beam between the projector and the screen has to be increased by folding to provide the necessary enlargement or where the screen is not in the direct line of the projected beam.

In my co-pending application, Ser. No. 280,040, filed May 13, 1963, now Patent No. 3,293,807, entitled, "Dual Projection Theatre and Console and Method Therefor," a motion picture theatre with a novel dual beam projection system is disclosed which requires, for full scale operation, very large mirrors for the projection of each of a pair of beams respectively onto each of a pair of rear illumination screens. This invention describes an improved beam projection system and console and method for projecting a beam which is particularly useful in connection with the double rear illumination screen theatre described and shown in the co-pending application and, consequently, the co-pending application is herewith incorporated by reference.

Previous attempts to use a number of smaller mirrors which were butt jointed to form a reflecting surface instead of a single large mirror for a beam projection system where a beam had to be enlarged and bent, were generally unsuccessful. The main problem associated with the use of a number of smaller mirrors in lieu of a single large mirror is the optical discontinuity created by the abutting edges of the smaller mirrors, for both back surface reflection mirrors and front surface reflection mirrors.

Accordingly, it is an object of this invention to provide an improved beam projection system for projecting a beam of light.

It is a further object of this invention to provide a dual beam projection console particularly useful for projecting images simultaneously upon two screens.

It is also an object of this invention to provide an improved means and method for bending a beam of light in which a beam is first divided into segments (a process referred to hereinafter as segmenting) and thereafter recombined or reassembled for subsequent utilization in its original form.

It is still another object of this invention to eliminate the necessity of utilizing a large single reflecting surface for bending projection beams, or other beams containing intelligence, and replacing this large single reflecting surface by a plurality of smaller reflecting surfaces which may be spaced apart without loss of any portion of the image or the introduction of discontinuities.

It is a still further object of this invention to provide an apparatus and a method for bending a projection beam by at least two reflection surfaces, the first of which utilizes a segmented reflecting surface which divides the beam into a number of smaller beams, and the last of which recombines the smaller beams into the original, complete and continuous beam.

It is a still further object of this invention to provide an improved beam projection system, a console for duel beam projection from a single projector, and a segmented beam projection system using a plurality of small mirrors for convenient and efficient beam projection.

Briefly described, this invention relates to a beam projection system including beam projection means for projecting a diverging beam of light. The beam projection system also includes a beam segmentation means for segmenting the beam received from the beam projection means. At least one set of reflector means is associated with the beam segmenting means for individually reflecting each beam segment received therefrom. The beam segmenting means and the set of reflecting means each comprise a plurality of mirrors, each having the same number of mirrors with respect to the other for the purpose of reflecting individual portions of the beam.

There is also described a dual beam projection console for selecting one of a number of projection beams, for splitting the selected projection beam into two branch beams, and for segmenting and directing the two branch beams. The console includes a housing and beam selector means supported in the housing and movable between a number of selected positions. Beam splitting means are also supported in the housing and arranged to split the projection beam into the two branch beams. Beam segmenting means located in the housing are associated with each branch beam to segment the associated branch beam into individual beam segments and to project the beam segments through a beam exit aperture in the housing.

There is further described a method of projecting a beam wherein a unitary or composite beam is formed and then divided (or segmented) into a number of individual beam segments. The individual beam segments of the projection beam are, after the desired amount of bending, reassembled into a single projection beam on a projection screen.

Preferably, when the projection beam is segmented into a number of individual beam segments, each of the beam segments of the divided or segmented projection beam is angularly diverged for better separation. For reassembly, the angularly diverged segments are combined by a converging arrangement of reflectors on the projection screen.

Other objects and a better understanding of the invention may be had by reference to the following description, taken in conjunction with the accompanying drawings, in which:

FIGURE 2 is an enlarged cutaway view of the dual beam projection console of FIGURE 1 showing the beam selector, beam splitter and beam segmenter;

FIGURES 3A and 3B are illustrative diagrams of butt joined mirrors showing the deterioration of an angularly incident projection beam due to the joint;

FIGURE 5 is an enlarged view of the beam projector and segmenter of FIGURE 4; and FIGURE 6 is a perspective view of an adjustable mirror support means.

Figure 1:
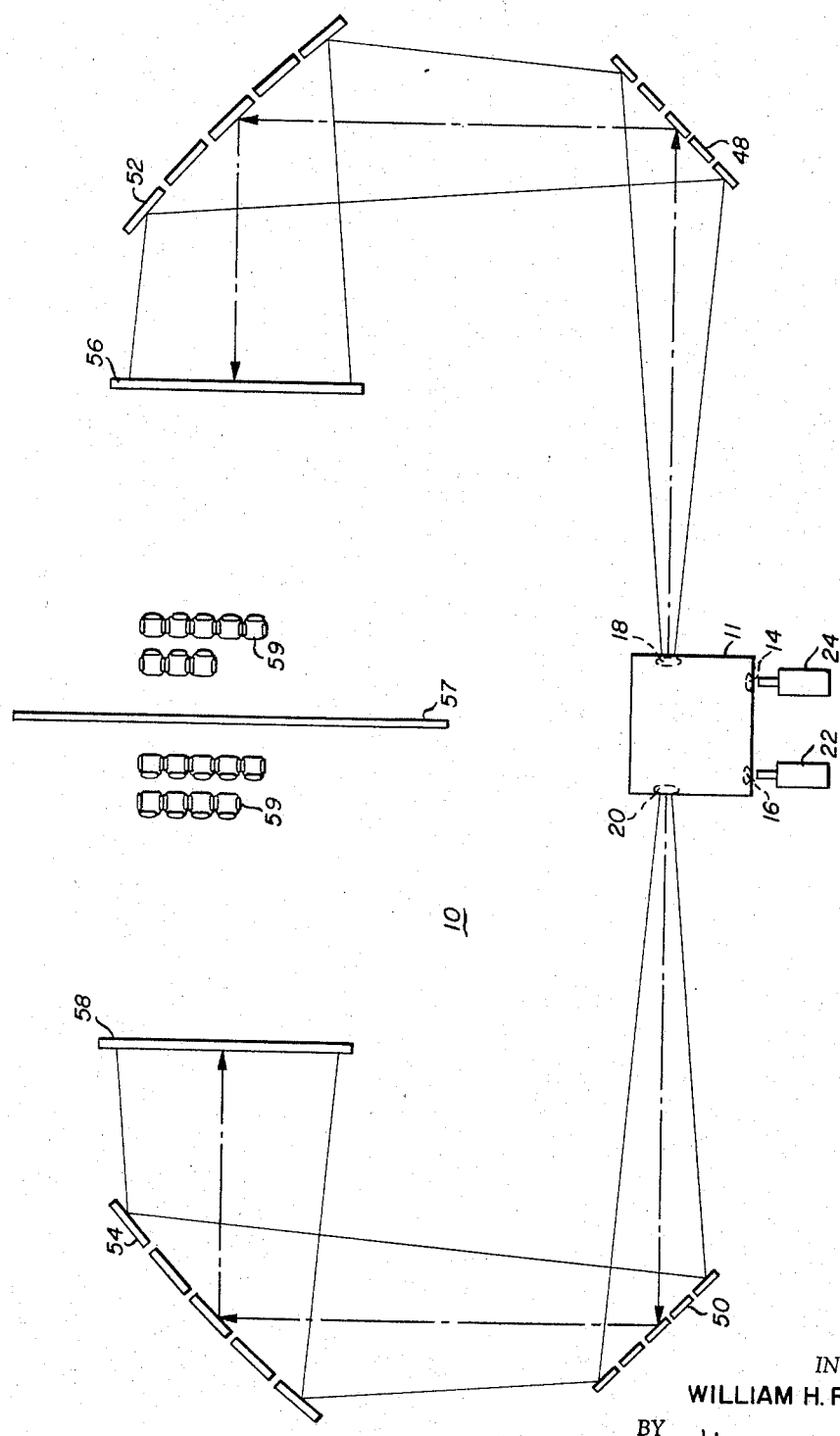
FIGURE 1 is an illustrative schematic layout of a dual projection motion picture theatre utilizing the segmented beam projection system and method of this invention of bending branch projection beams for illuminating opposed rear illumination projection screens.

Referring to FIGURES 1 and 2, there is shown a dual beam projection system generally designated by reference character 10. Dual beam projection system 10 includes a dual beam projector 11 which has a housing 12 containing apertures 14, 16, 18 and 20 whose function will be described hereafter. Beam projection means 22 and 24, such as a pair of conventional movie projectors, are provided to project a pair of beams through beam entrance apertures 14 and 16 respectively. Conventional reflectors 26 and 28 reflect the beam from projectors 22 and 24, respectively, towards a beam selecting means 30 which may take the form of an angularly movable mirror, movable between position 32 as shown and position 34 as indicated by the broken line 34.

Controls, as shown in the above-identified co-pending application, are used to alternatively permit the projection beam from either projector 22 or 24 to be selected for reflection by the selector means 30. The selected projection beam from either projector 22 or 24 is reflected by beam selecting mirror 30 towards a beam splitter 36. Beam splitter 36, which may be a half silvered mirror, reflects one half of the projection beam received from beam selection mirror 30 towards a reflector 38 and transmits the other half of the projection beam towards a reflector 40 and in this manner forms a pair of branch beams. Reflector 40 reflects the branch beam received from beam splitting mirror 36 towards a reflector 42.

Located to intercept the branch beams from reflectors 38 and 42, respectively, are segmentation means 44 and 46 which comprise a plurality of narrow strip reflectors disposed in an overlapping arrangement. Segmentation means 44 divides the branch projection beam received from the reflector 38 whereas segmentation means 46 divides the projection beam received from the reflector 42. The segmented branch beams from segmentation means 44 and 46 exit through apertures 18 and 20, respectively, out of housing 12.

The individual reflectors forming segmentation means 44 and 46 are individual mirrors, which reflect from the front surface (as contrasted with rear surface). The overlapping mirror arrangement of segmentation means 44 and 46, as shown in greater detail in FIGURE 5, serves to divide the received projection beam into a number of individual distinct segments without loss of any portion of the received projection beam. The overlapping mirror arrangement hides the edge portions of each mirror, which are non-reflecting, from the projection beam which strikes segmenters 44 and 46 at an angle of 45 degrees as will be explained in greater detail hereinafter.

Referring now solely to FIGURE 1, there is shown interposed in the path of the segmented branch beams a first and second set of reflector means 48 and 50, each of which comprises a plurality of mirrors. The mirrors in each set are shown arranged in sets, and as will become better understood hereinafter, are equal in number to the number of mirrors of each of the segmenters 44 and 46 and are each optically associated with a mirror of segmenters 46 and 44. The segmented and once reflected branch beams are then once more reflected by another pair of reflection means 52 and 54, respectively, which are similar in arrangement and structure to reflectors 48 and 50 except that each individual mirror is larger in width and length and arranged in convex fashion. The twice reflected segmented branch beams are then focused onto a pair of rear surface screens 56 and 58 for viewing by an audience seated in chairs 59 across a partition 57.

Each of the mirrors, such as 93, of reflectors 54, 52, 50, 48, 46 and 44 is individually and adjustably supported by a suitable adjustable means such as the ball and socket arrangement 90, shown in FIGURE 6, movable in a first slide 91. Slide 91 is carried in a slide 92. When the upper end of mirror 93 is likewise supported in this manner each individual mirror is adjustable about its horizontal axis, its vertical axis, and laterally with respect to adjacent mirrors in its mirror assembly. In fact, the arrangement shown in FIGURE 6 and applied to support both ends of the mirror, permits 5 degrees of adjustment as indicated by the various arrows.

For a better understanding of this invention, there is shown in FIGURES 3A and 3B the effect of bending a beam with butt jointed reflectors for rear surface and for front surface reflectors. FIGURE 3A depicts an arrangement where a beam of light 60 is incident, at an angle of 45 degrees, upon a pair of rear surface mirrors 61 and 62 which are butt jointed at 63. Butt joint 63 behaves as an optical discontinuity and either distorts or blocks light beam 60 from being properly reflected. The effect of the discontinuity is to create a shadow (or at least a very serious distortion) in an area where reflected light beam 64 is or should be, the width of the distortion increasing with increasing angle of incidence.

FIGURE 3B depicts a pair of front surface reflectors 65 and 66, butt jointed at 67, and a beam of light 68 incident upon reflectors 65 and 66 over the area of butt joint 67. There is also shown a reflected beam 69 which includes a discontinuity caused by the butt joint and appearing in the form of a shadow 69a (or at least a line of very serious distortion). As in the case of butt jointed rear surface reflectors, the width of the shadow due to the distortion increases with increase of the obliqueness of the incident beam, and even though the shadow is much narrower for front surface reflectors, it deteriorates the image on the projection screen, such as screen 56, FIGURE 1, to such an extent that such projected image is not usable. Accordingly, butt jointing of reflectors does not solve the problem.

Figure 4:
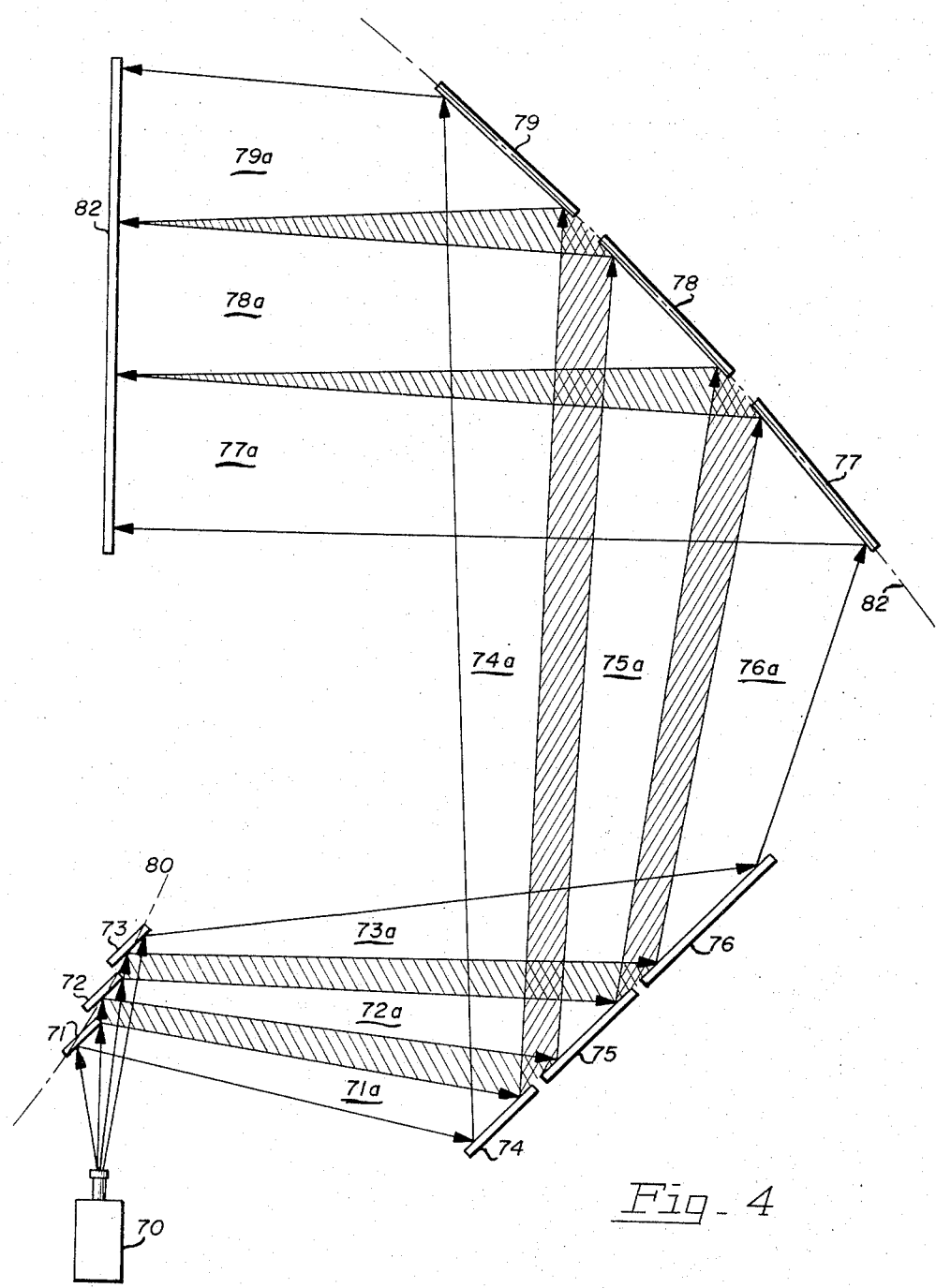
FIGURE 4 is an illustrative view of a triple reflection beam projection system in accordance with this invention.

Referring to FIGURES 4 and 5, a single beam projection system constructed in accordance with the present invention is shown. A beam from a projector 70 is reflectively segmented or divided into three individual segments 71a, 72a and 73a by three overlapping, front surface reflection mirrors 71, 72 and 73 which form a segmenter. It is to be noted that for proper segmentation by reflection, the individual mirrors making up the segmenter must be arranged so that the edge of one mirror overlaps the end portion of the next further distant mirror as shown.

Individual segments 71a, 72a and 73a are then further reflected in the ordinary manner by providing successively larger mirrors for reflection. As shown in FIGURE 4, the beam segments are reflected by means of mirrors 74, 75 and 76 to form beam segments 74a, 75a and 76a. If beam segments 74a, 75a and 76a are now to be reflected on a projection screen, such as 82, it will be necessary to assemble or recombine the beam segments into the original beam. This is accomplished by mirrors 77, 78 and 79 which are positioned and arranged to intercept segmented beams 74a, 75a and 76a and to reflect these segments, as beams 77a, 78a and 79a, onto screen 82 in such a manner that adjacent edges of segments 77a, 78a and of 78a and 79a coincide.

Referring to FIGURE 5, there is shown the segmenter portion of FIGURE 4 further enlarged and the same parts are designated by the same reference characters. Mirrors 71, 72 and 73 of the segmenter are shown arranged in a slightly convex configuration as indicated by dash-dotted line 80 even though each mirror makes an angle of approximately 45 degrees with incident beam. The reason for this configuration is to angularly diverge the beam segments so that the shadow areas or beam segment separation increases and that mirrors 74, 75 and 76 (FIGURE 4) may be conveniently separated. The greater the desired separation of mirrors for reflecting the beam segments, the greater the convexity of the arrangement of mirrors 71, 72 and 73. It is to be noted that mirrors 71, 72 and 73 may be arranged parallel to one another in which case segment separation, provided by the overlap, remains constant. If this segment separation is sufficient there is no need for the convex arrangement. However, as a practical matter, some angular divergence is usually desired.

Referring again to FIGURE 4, the shadows or portion between beam segments are directed to fall in the vicinity of the edge portions between mirrors 74, 75 and 76 and across the mirror gaps so that the beam segments land entirely on mirrors 74, 75 and 76. Consequently, the reflection of the three beam segments from mirrors 74, 75 and 76 onto mirrors 77, 78 and 79 is carried out without the possibility of distortion due to mirror edges and the mirrors 77, 78 and 79 cast or reflect the beam portions received from mirrors 76, 75 and 74 onto the screen 82.

Mirrors, 77, 78 and 79 are arranged in a concave configuration indicated by dash-dotted line 82. In this manner, mirrors 77, 78 and 79 assemble the reflected beam segments onto the screen 82, and thereby provide a composite image thereon free from shadows or distortion due to mirror separation. Actually, mirrors 77, 78 and 79 are arranged along a concave surface to decrease the angular divergence of the beam segments to zero at the screen. The greater the angular beam segments separation, the greater must be the curvature to accomplish such assembly.

Mirrors 74, 75, 76, 77, 78 and 79 can be either front or rear surface reflection mirrors and their separation depends entirely on the angular dispersion of the beam segments. Since rear surface reflectors also reflect, even though to a very small degree, from the front surface to generate what is commonly referred to as "ghosts," front surface reflectors are preferred. However, it has been found that very excellent images man be obtained for exhibition purposes with rear surface reflectors and that "ghosts" are not visually perceptible.

Mirrors 71, 72 and 73 have a width of $X_1$, $X_2$ and $X_3$ respectively, mirrors 74, 75 and 76 have a width of $Y_1$, $Y_2$ and $Y_3$ respectively, and mirrors 79, 78 and 77 have a width of $Z_1$, $Z_2$ and $Z_3$ respectively.

The widths of mirrors 71 and 74 are related by the following equation:

$$\frac{X_1}{Y_1} = \frac{P_1}{Q_1}$$

where $P_1$ is the distance of the mirror 71 from beam projector 70, and $Q_1$ is the distance of the mirror 74 from beam projector 70. The remaining mirrors of the segmenter and the first reflector are related in the same manner.

The width of mirrors 71 and 79 are related by the following equation:

$$\frac{X_1}{Z_1} = \frac{P_1}{R_1}$$

where $P_1$ is the distance of the mirror 71 from the beam projector 70, and $R_1$ is the distance of the mirror 79 from the beam projector 70.

The above described segmentation method may be referred to as strip segmentation since the beam is divided into long, narrow strips. The number of strips into which the beam is divided, and therefore the necessary number of reflectors in the segmenter, is usually determined by the available width of mirrors for reflecting the segmented beam directly onto the projection screen or some other utilization device. In other words, the number is selected by the available or desired width of the recombining mirrors. If the width of a non-segmented beam intercepted by the last reflecting surface is W, and if the most economical and readily available mirror width is say W/6, the beam is divided into at least six and preferably seven segmented portions. In case the beam is segmented in seven portions there will be ample space on a mirror having a width of W/6 to avoid cutting off the edges of the image.

Further, in the strip segmentation process the mirrors comprising the segmenter are arranged along a convex cylindrical surface for angular dispersion of the individual beam segments. This produces an enlargement of the shaded portion and allows for greater separation of the individual mirrors which bend the beams subsequent to segmentation. To assemble the individual beam segments, the mirrors making up the last reflecting surface are arranged along a concave cylindrical surface for recombination.

The above described segmentation method by reflection is not only applicable to divide a projected beam (whether parallel or divergent) into narrow strips extending across the full length of the projection beam, but may also be applied to square or area segmentation. In other words, the beam may be segmented vertically and horizontally to provide segmented areas instead of strips.

For double segmentation, the segmenter comprises a plurality of small rectangular mirrors arranged in rows and columns and in overlapping relationship. To provide segment separation (angular divergence of each individual beam segment) the mirrors are further arranged to lie on the outer surface of a sphere for dispersion in the horizontal and vertical plane. All subsequent reflecting surfaces include only planar mirrors, one for each beam segment. The final reflecting surface, which assembles the segments, comprises a plurality of mirrors just like any intermediate reflecting surface but the individual mirrors are arranged to lie on the inside of a spherical shell to converge the segments of the screen to form a single picture.

Instead of segmenting a beam in two directions with a single segmenter, the same result may be accomplished in two steps. A first segmenter takes the form of a strip segmenter as shown in FIGURE 5 and a second segmenter takes the form of a plurality of strip segmenters to segment each strip into smaller areas. For example, the first reflecting surface segments the beam into vertical strips and the second reflecting surface segments each strip horizontally into squares. The beam is then recombined or assembled, either in one step by a combiner in which individual small planar mirrors are arranged to form a concave spherical surface, or in two steps by first assembling the horizontally separated portions into strips and then, in connection with the last reflection, assembling the horizontal strips to form the original image.

It is also to be understood that for dual projection application the single projection beam may also first be segmented and thereafter the segments may be split by a beam splitter to produce segmented branch beams. This is the reverse process of that shown in FIGURE 2 where the projection beam is first split into branch beams and where thereafter the branch beams are segmented.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims:

I claim:

1. A method of projecting a single image bearing projection beam from a projector simultaneously upon the rear surface of spaced apart and facing first and second projection screens, said method comprising the steps of:

splitting said projection beam into first and second branch beams;

reflectively segmenting said first and second branch beams separately into a number of beam segments each of which contains a different portion of the cross section of the branch beams;

reflectively bending each of said first branch beam segments, individually and successively, until directed for interception with the rear surface of said first screen;

reflectively bending each of said second branch beam segments, individually and successively, until directed for interception with the rear surface of said second screen;

assembling said individual first branch beam segments during the last reflective bending by directing said beam segments for coincidence of adjacent edges of adjacent beam segments at said first screen; and assembling said individual second branch beam segments during the last reflective bending by directing said beam segments for coincidence of adjacent edges of adjacent beam segments of said second screen.

2. A beam projection system comprising, in combination:

beam projection means for providing an image bearing projection beam adapted to produce the born image upon an intercepting projection screen;

at least two segmenting reflectors arranged to have substantially parallel reflection planes which are angularly disposed in the path of said projection beam to form beam segments which contain different portions of the cross section of said projection beam, said segmenting reflectors being stacked in overlapping relationship so that the edge furthest from said projection means of one reflector forwardly overlaps the edge closest to said projector means of the adjacent reflector;

a projection screen; and an assembling reflector associated with each segmenting reflector, each of said assembling reflectors being disposed in the path of the associated beam segment and being oriented to direct the associated beam segment onto said projection screen in such a manner that adjacent edges of adjacent beam segments coincide when intercepting said projection screen.

3. A beam projection system in accordance with claim 2 in which said segmenting reflectors reflect from their front surfaces and are angularly disposed with respect to said projection beam to form angularly diverging beam segments.

4. A beam projection system in accordance with claim 3 in which at least one further reflector is associated with each beam segment, said further reflectors being disposed between said segmenting reflectors and said assembling reflectors to intercept beam segments from said segmenting reflectors and to direct them for interception by said assembling reflectors.

References Cited

UNITED STATES PATENTS

| 3,038,370 | 6/1962 | Nakamatsu | 352—70 |
| 3,144,806 | 8/1964 | Smith | 88—24 |
| 1,874,615 | 8/1932 | Pilny | 352—67 |
| 2,045,119 | 6/1936 | Carpenter | 95—18 |
| 3,293,807 | 12/1966 | Ramsell | 88—24 |

FOREIGN PATENTS

| 960,422 | 6/1964 | Great Britain. |
| 149,461 | 12/1952 | Australia. |
| 195,630 | 12/1923 | Great Britain. |

NORTON ANSHER, *Primary Examiner.*

W. M. FRYE, R. M. SHEER, *Assistant Examiners.*